(12) United States Patent
Yu et al.

(10) Patent No.: US 12,627,119 B2
(45) Date of Patent: May 12, 2026

(54) BACKPACK POWER SUPPLY DEVICE AND BACKPACK TOOL SYSTEM

(71) Applicant: Greenworks (Jiangsu) Co., Ltd., Changzhou (CN)

(72) Inventors: Xinxin Yu, Changzhou (CN); Jianbo Li, Changzhou (CN)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 367 days.

(21) Appl. No.: 18/509,265

(22) Filed: Nov. 14, 2023

(65) Prior Publication Data

US 2024/0088630 A1 Mar. 14, 2024

Related U.S. Application Data

(63) Continuation of application No. PCT/CN2022/098431, filed on Jun. 13, 2022.

(30) Foreign Application Priority Data

Jun. 15, 2021 (CN) .......................... 202121323124.5
Jul. 13, 2021 (CN) .......................... 202110787930.6
(Continued)

(51) Int. Cl.
| | |
|---|---|
| *H02B 1/26* | (2006.01) |
| *H01M 50/247* | (2021.01) |
| *H02B 1/20* | (2006.01) |

(52) U.S. Cl.
CPC ............ *H02B 1/26* (2013.01); *H01M 50/247* (2021.01); *H02B 1/202* (2013.01); *H01M 2220/30* (2013.01)

(58) Field of Classification Search
CPC ................................ H01M 50/247; B25F 5/00
See application file for complete search history.

(56) References Cited

U.S. PATENT DOCUMENTS

| | | | |
|---|---|---|---|
| 6,305,048 B1 | 10/2001 | Salisian | |
| 2014/0011061 A1* | 1/2014 | Yoshinari | B25F 5/00 |
| | | | 429/98 |

(Continued)

FOREIGN PATENT DOCUMENTS

| | | |
|---|---|---|
| CN | 1883095 A | 12/2006 |
| CN | 103170953 A | 6/2013 |

(Continued)

*Primary Examiner* — Nathaniel C Chukwurah

(57) ABSTRACT

A backpack power supply device and a backpack tool system is provided. The backpack power supply device includes: a backpack assembly, a battery pack, a control panel and a power cable. Wherein, the battery pack and the control panel are arranged on the backpack assembly, and the control panel is electrically connected with the battery pack. A first end of the power cable is electrically connected with the battery pack and the control panel, and a second end is provided with a connecting terminal that may be electrically connected with multiple power tools. The power tool adjusts its operating state according to a signals received from the control panel. The backpack power supply device and backpack tool system may solve problems of high cost of the conventional backpack garden tool systems and poor interchangeability of power tools.

19 Claims, 14 Drawing Sheets

(30) Foreign Application Priority Data

| | | | |
|---|---|---|---|
| Jul. 13, 2021 | (CN) | .......................... | 202110787936.3 |
| Jul. 13, 2021 | (CN) | .......................... | 202121590802.4 |

(56) References Cited

U.S. PATENT DOCUMENTS

| | | | | |
|---|---|---|---|---|
| 2015/0188332 A1* | 7/2015 | Nakano | ................... | H02J 7/342 |
| | | | | 320/112 |
| 2015/0194646 A1* | 7/2015 | Yoshinari | ................... | B25F 5/00 |
| | | | | 429/187 |
| 2015/0255773 A1* | 9/2015 | Yoshinari | ........... | H01M 10/653 |
| | | | | 429/93 |
| 2016/0345714 A1* | 12/2016 | Yamaoka | ................... | B25F 5/02 |
| 2017/0014984 A1 | 1/2017 | Rola et al. | | |
| 2019/0280266 A1* | 9/2019 | Zhang | ................. | H01M 50/213 |
| 2021/0116911 A1 | 4/2021 | Pjevach | | |

FOREIGN PATENT DOCUMENTS

| | | | |
|---|---|---|---|
| CN | 104411463 | A | 3/2015 |
| CN | 106105798 | A | 11/2016 |
| CN | 207040310 | U | 2/2018 |
| CN | 107919447 | A | 4/2018 |
| CN | 107979254 | A | 5/2018 |
| CN | 207290008 | U | 5/2018 |
| CN | 108539676 | A | 9/2018 |
| CN | 208179397 | U | 12/2018 |
| CN | 109277998 | A | 1/2019 |
| CN | 109454596 | A | 3/2019 |
| CN | 110401385 | A | 11/2019 |
| CN | 110828743 | A | 2/2020 |
| CN | 110911597 | A | 3/2020 |
| CN | 113506943 | A | 10/2021 |
| EP | 3106565 | A2 | 12/2016 |
| EP | 3270437 | A1 | 1/2018 |
| JP | H1175349 | A | 3/1999 |
| JP | 2014017098 | A | 1/2014 |
| JP | 2016026895 | A | 2/2016 |
| JP | 2021051986 | A | 4/2021 |
| WO | 201313937 | A1 | 9/2013 |
| WO | 2019201300 | A1 | 10/2019 |
| WO | 2021022591 | A1 | 2/2021 |

* cited by examiner

210

111

1111

112

114

A

A

200

BACKPACK POWER SUPPLY DEVICE AND BACKPACK TOOL SYSTEM

The present application is a continuation Applications of PCT application No. PCT/CN2022/098431 filed on Jun. 13, 2022, which claims the benefit of CN202121323124.5 filed on Jun. 15, 2021, CN202121590802.4 filed on Jul. 13, 2021, CN202110787936.3 filed on Jul. 13, 2021, CN202110787930.6 filed on Jul. 13, 2021. All the above are hereby incorporated by reference.

TECHNICAL FIELD

The disclosure relates to a technical field of garden tools, in particular to a backpack power supply device and a backpack tool system.

BACKGROUND

Currently, there are many types of garden tools on the market. Most of them output power through the motor mounted in the power tool, and convert the motor power into the opening and closing movement of the blade through the transmission structure, so as to perform trimming. However, conventional garden tools need to be equipped with independent power supply systems, and the power supply systems are not interchangeable, so the cost is high and the range of use is narrow.

SUMMARY

The disclosure provides a backpack power supply device and a backpack tool system to solve problems of high cost of conventional backpack garden tool systems and poor interchangeability of power tools.

The disclosure provides the backpack power supply device. The backpack power supply device includes a backpack assembly, a battery pack, a control panel and a power cable. Wherein, the backpack assembly is used to carry the power supply device on an operator's body. The battery pack is arranged on the backpack assembly. The control panel is arranged on the backpack assembly and electrically connected with the battery pack. A first end of the power cable is electrically connected with the battery pack and the control panel, a second end of the power cable is provided with at least one connecting terminal that is capable of being electrically connected to a plurality of power tools, and the plurality of power tools are capable of adjusting its an operating state according to a signal received from the control panel.

In an embodiment of the backpack power supply device of the disclosure, the backpack power supply device further includes a memory, and the memory is capable of storing at least one of operating mode parameters, operating states, battery pack operating parameters, fault information, and usage data of the power tool.

In an embodiment of the backpack power supply device of the disclosure, the backpack assembly comprises a battery pack mounting base, and the control panel, the battery pack and the power cable are all arranged on the battery pack mounting base.

In an embodiment of the backpack power supply device of the disclosure, the battery pack mounting base is provided with a track, a first end of the track is open, a second end of the track is provided with an electrical terminal, the battery pack is slidably connected with the track, and is electrically connected with the electrical terminal after sliding into place.

In an embodiment of the backpack power supply device of the disclosure, the backpack assembly further comprises a hip belt and a shoulder strap, the hip belt is connected through a buckle, and the battery pack mounting base is capable of being detachably connected to a left hand position of the hip belt.

In an embodiment of the backpack power supply device of the disclosure, the backpack assembly further includes a sternum strap to fix the power cable to the backpack assembly.

In an embodiment of the backpack power supply device of the disclosure, the power cable is a six-core wire, and the connecting terminal is a six-core plug.

In an embodiment of the backpack power supply device of the disclosure, the backpack power supply device further includes a first temperature sensor to detect a temperature of the control panel, the first temperature sensor is electrically connected with the control panel.

The disclosure further provides a backpack tool system. The backpack tool system includes a backpack power supply device and a power tool. A motor is arranged inside the power tool. Wherein, the backpack power supply device comprises a backpack assembly, a battery pack, a control panel and a power cable, the battery pack and the control panel are arranged on the backpack assembly, the control panel is electrically connected with the battery pack, a first end of the power cable is electrically connected with the battery pack and the control panel, a second end of the power cable is electrically connected with power tool, the second end of the power cable that is electrically connected with the power tool is provided with at least one connecting terminal that is capable of being electrically connected with a plurality of the power tools, and the power tool is capable of adjusting an operating state according to a signal received from the control panel.

In an embodiment of the backpack tool system of the disclosure, the backpack power supply device further comprises a power tool storage cover arranged on a side of the backpack assembly, and the power tool storage cover is capable of being detachably connected to the backpack assembly.

In an embodiment of the backpack tool system of the disclosure, the backpack power supply device further comprises a power tool recording system.

In an embodiment of the backpack tool system of the disclosure, the power tool recording system comprises a memory, the memory is electrically connected with the control panel, the control panel is configured to read current information of the power tool and stores usage data of the power tool according to the current information.

In an embodiment of the backpack tool system of the disclosure, usage data includes at least one of a number of cutting times of the power tool, failure history, blade sharpening or replacement reminders.

In an embodiment of the backpack tool system of the disclosure, the control panel is configured to determine and record the number of the cutting times s of the corresponding power tool through changes in a current waveform, and remind that a blade needs to be replaced based on the number of the cutting times.

In an embodiment of the backpack tool system of the disclosure, the control panel is configured to determine whether the power tool needs maintenance based on changes in a motor current of the power tool.

In an embodiment of the backpack tool system of the disclosure, the backpack tool system further includes an alarm device, the alarm device is arranged on the backpack assembly or the power tool, and the alarm device is electrically connected with the control panel.

In an embodiment of the backpack tool system of the disclosure, the alarm device includes a warning light and a buzzer.

In an embodiment of the backpack tool system of the disclosure, the backpack tool system further includes a first tool and a second tool, the first tool and the second tool are configured to be electrically connected with the backpack power supply device through the power cable, and at least one of the first tool and the second tool is controlled by the control panel.

In an embodiment of the backpack tool system of the disclosure, a control signal of the control panel is transmitted to the first tool or the second tool through the power cable.

In an embodiment of the backpack tool system of the disclosure, a control signal of the control panel is transmitted to the first tool or the second tool through a wireless connection.

In an embodiment of the backpack tool system of the disclosure, when the first tool or the second tool is connected with the backpack power supply device, the control panel is configured to receive a signal transmitted by the first tool or the second tool to identify the first tool or the second tool.

In an embodiment of the backpack tool system of the disclosure, the control panel is configured to control an operation of the first tool or the second tool based on its type.

In an embodiment of the backpack tool system of the disclosure, the backpack power supply device further includes the memory, which stores the operating mode parameters of at least one tool, and the control panel is configured to retrieve the operating mode parameters based on a type of the first tool or the second tool to control its operation.

In an embodiment of the backpack tool system of the disclosure, the backpack tool system further includes a wireless communication module, and the backpack tool system is connected with an external intelligent device through the wireless communication module.

In an embodiment of the backpack tool system of the disclosure, the external intelligent device is provided with a display device capable of displaying a working status of the backpack tool system.

In an embodiment of the backpack tool system of the disclosure, the first tool and/or the second tool may be any one of a single-handed hedge trimmer, a hand saw, a garden shear, a grass shear, and a string trimmer.

In an embodiment of the backpack tool system of the disclosure, the backpack tool system further includes a second temperature sensor arranged in each body of the power tool. When a port of the power tool is electrically connected with the connecting terminal, the second temperature sensor is electrically connected with the control panel to send a motor temperature of the power tool to the control panel.

The disclosure further provides a control method of the backpack power supply device, the method including:

providing the backpack assembly, backpack assembly provided with the control panel, the battery pack, the memory, and the connecting terminal electrically connected with the control panel and the battery pack;

providing a plurality of power tools, each power tool being provided with a port for interchangeable electrical connection with the connecting terminal;

wherein, when the connecting terminal is electrically connected with the port, the control panel retrieves the corresponding power supply parameters in the memory according to relevant information of the motor in the power tool to control the battery pack to provide a matching power supply to the motor.

In an embodiment of the control method of the disclosure, the control method further includes: the control panel determining and recording a number of cutting times of shears based on current changes in the motor in the power tool.

In an embodiment of the control method of the disclosure, the control method further includes: sending an alarm signal, via the control panel, when the motor current in the power tool exceeds a set current range.

In an embodiment of the control method of the disclosure, the control method further includes: collecting a temperature of the motor and/or control panel and sending the alarm signal when the temperature exceeds a set threshold.

In summary, the backpack power supply device of the disclosure is provided with at least one connecting terminal that may be electrically connected with multiple power tools. One backpack power supply device may be applied to multiple power tools, has strong versatility, and saves cost of replacement and maintenance. In addition, a battery pack size of the backpack power supply device of the disclosure is not limited by a casing of the power tool, so the battery pack may provide sufficient electric energy and have a long battery life.

In the backpack tool system of the disclosure, the control panel and the battery pack are mounted on the backpack assembly outside the body of the power tool, which may enable a body structure of the power tool to be more compact, reduce a body size and weight of the power tool, cost of the power tool, and difficulty and fatigue of operators when operating power tools with one hand. Moreover, the backpack tool system of the disclosure has good heat dissipation, low failure rate, long battery life and long duration life.

The control method of the power supply device of the disclosure may provide corresponding electric energy output for power tools of different specifications through the same power supply device, which greatly improves a versatility of the power supply device.

BRIEF DESCRIPTION OF THE DRAWINGS

In order to more clearly explain embodiments of the disclosure or technical solutions in the conventional art, drawings needed to describe the embodiments or the conventional art will be briefly introduced below.

PART NUMBER DESCRIPTION

100—backpack assembly; 110—battery pack mounting base; 111—first housing; 1111—track; 1112—positioning column; 1113—reinforcing rib; 112—second housing; 114—electrical terminal; 115—control panel cover; 120—hip belt; 130—shoulder strap; 140—power tool storage cover; 141—storage bag; 142—soft connector; 150—sternum strap; 151—first sternum strap; 152—second sternum strap; 153—second buckle; 160—first buckle; 170—accessory bag; 200—power cable; 210—power cable double buckle mounting structure; 211—first clamping body; 2111—first matching surface; 2112—second protruding part; 2113—first protruding part; 2114—first anti-rotation plane; 212—second clamping body; 2121—second matching surface; 2122—concave groove; 2123—second anti-rotation plane; 213—rubber clamping head; 2131—clamping groove; 21311—first side wall; 21312—second side wall; 21313—connecting body; 213131—matching plane; 214—positioning hole; 215—splicing seam; 216—accommodating cavity; 220—plug; 221—locking nut; 300—power tool; 310—35 mm garden shear; 320—single-handed hedge trimmer; 330—small hand saw; 340—45 mm garden shear; 350—grass trimmer; 360—hedge trimmer; 361—casing; 3611—rear handle; 3612—auxiliary handle; 3613—guard; 362—motor; 3621—blower fan; 3622—wind blocking board; 3623—fan blade; 363—gearbox; 3631—upper housing; 3632—lower housing; 3633—blower space; 36331—ventilation hole; 3634—heat dissipation piece; 364—blade assembly; 365—control component; 400—battery pack; 500—control panel.

DETAILED DESCRIPTION

Embodiments of the disclosure are described below through specific examples. The following embodiments and features in the embodiments may be combined with each other unless there is any conflict. Obviously, the described embodiments are only some of the embodiments of the disclosure, not all of them. All other embodiments obtained by persons of ordinary skill in the art based on the embodiments in the disclosure without creative efforts fall within a protection scope of the disclosure.

Please refer to FIG. 1 through FIG. 23. The disclosure provides a backpack power supply device and a backpack tool system. The backpack tool system includes a power tool and the backpack power supply device of the disclosure. The power tool is powered by a backpack external power supply, so that a body of the power tool may be more compact, which reduces a body size and weight of the power tool, and difficulty and fatigue of operators when operating the power tool with one hand.

Figure 1:
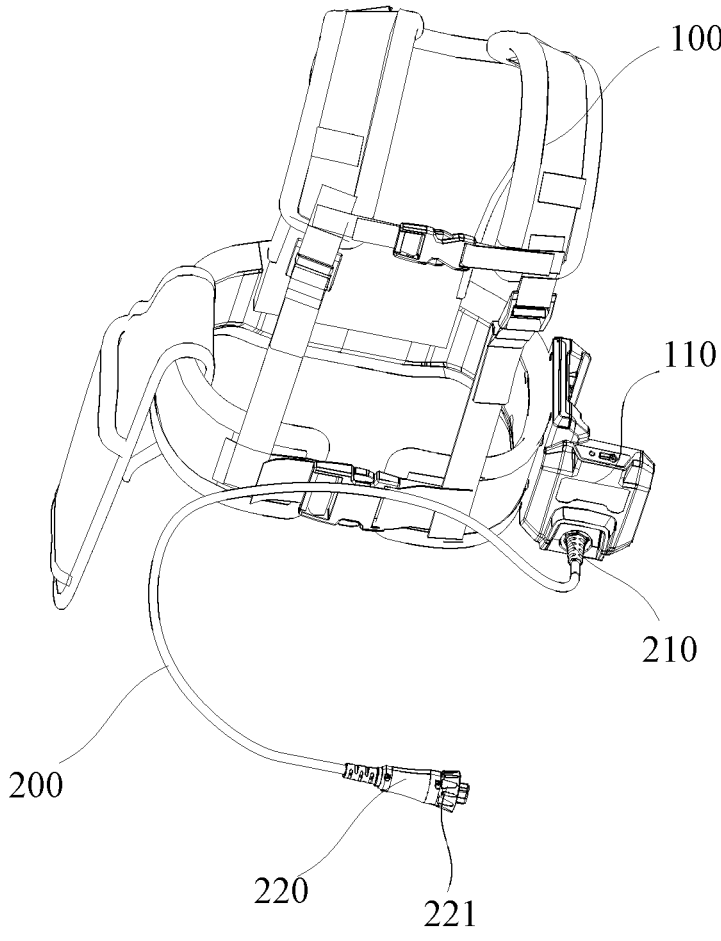
FIG. 1 is a perspective schematic view of a backpack power supply device according to an embodiment of the disclosure.
Figure 2:
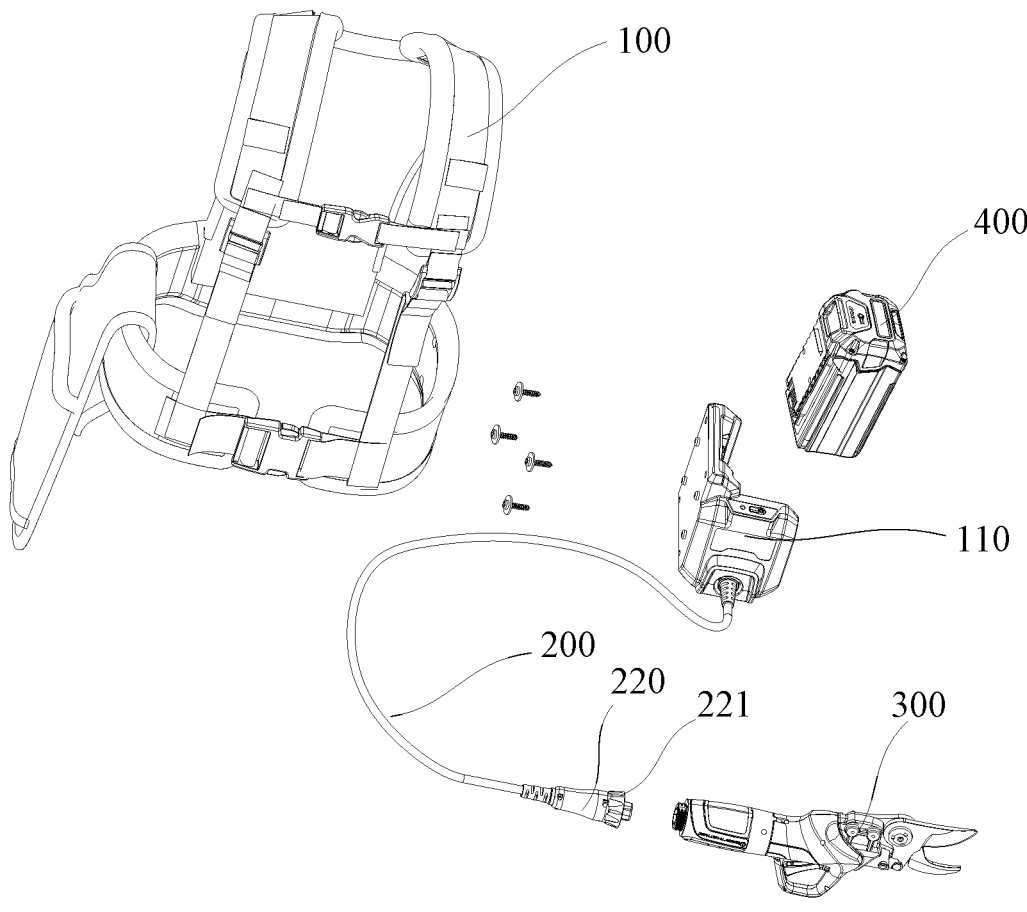
FIG. 2 is an exploded schematic view of the backpack power supply device after it is connected with a power tool according to an embodiment of the disclosure.
Figure 3:
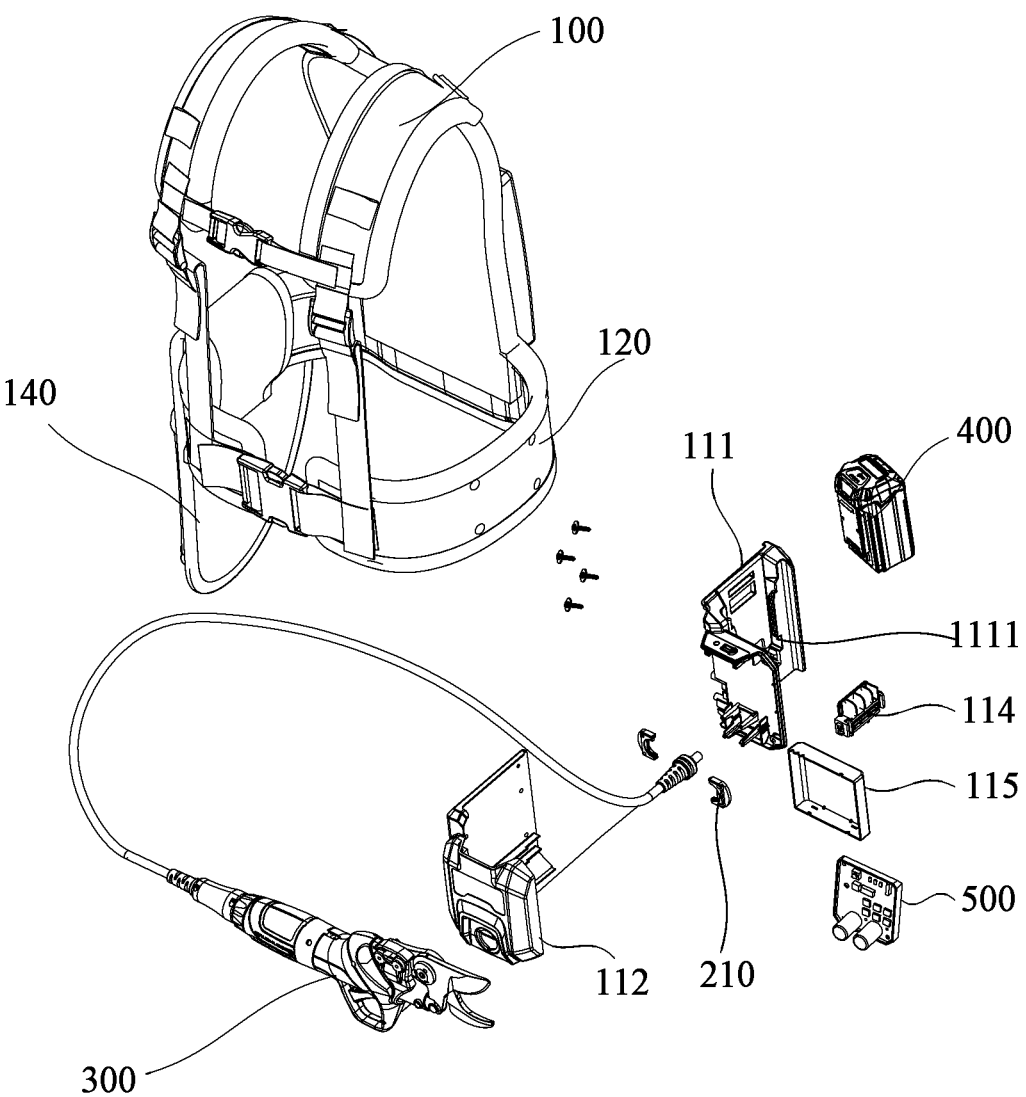
FIG. 3 is an exploded schematic view of a battery pack mounting base after the backpack power supply device is connected with the power tool according to an embodiment of the disclosure.

Please refer to FIG. 1 through FIG. 3. The backpack power supply device of the disclosure includes a backpack assembly 100, a battery pack 400, a control panel 500 and a power cable 200. Wherein, the backpack assembly 100 is used to carry the power supply device on an operator's body. The battery pack 400 is arranged on the backpack assembly 100. The battery pack 400 may be mounted on the backpack assembly 100 in various ways, such as being carried on a back or hanging on both sides of operator's waist. The control panel 500 is arranged on the backpack assembly 100 and is electrically connected with the battery pack 400. A first end of the power cable 200 is mounted on the backpack assembly 100 and is electrically connected with the battery pack 400 and the control panel 500. A second end of the power cable 200 is provided with at least one connecting terminal that may be electrically connected with a plurality of power tools 300. The above-mentioned backpack power supply device may be applied to multiple power tools, have strong versatility, and save users' cost of replacement and maintenance.

Please refer to FIG. 3. The battery pack 400 in the backpack power supply device of the disclosure may provide electric energy to different power tools 300 with motors of the same specification, and may also be manually adjusted and set to provide matching electric energy to power tools 300 with motors of different specifications, for example, through a switch or a button to change a connecting state of the circuit, thereby controlling an output voltage of the battery pack 400. In one embodiment, the backpack power supply device further includes an automatic power matching system. The automatic power matching system includes a memory. The memory is electrically connected with the control panel 500. When the power tool 300 is electrically connected with the connecting terminal, the control panel 500 retrieves the corresponding power supply parameters in the memory according to relevant information of a motor in the power tool 300, so that the battery pack 400 provides a matching power supply to the motor, such as providing a matching voltage output and/or power output.

In order to facilitate timely understanding of working states of the power tool 300, in one embodiment, the backpack power supply device further includes a power tool recording system. The power tool recording system includes a memory (not shown). The memory is electrically connected with the control panel 500. The control panel 500 reads current information of the power tool 300 and stores usage data of different power tools 300 according to the current information. It should be noted that the memory of the power tool recording system in the disclosure may be the same memory as the memory of the automatic power matching system, or an independent memory may be provided. As long as a corresponding storage function can be realized, a specific setting method is not limited.

Please refer to FIG. 3. In one embodiment, the power tool 300 is an electric scissor, and the usage data includes any one or more of the number of cutting times the power tool 300, fault history, blade grinding or replacement reminders. The control panel 500 reads a current value of the motor in the power tool 300, records current changes when the scissors are cutting through the memory, and determines and records the number of cutting times of the scissors based on a number of waveforms of current changes. After blades of the power tool 300 are replaced, the data of the number of cutting times is reset to zero. When a cumulative number of cutting times exceeds a set value, a controller issues a reminder for blade grinding or replacement. The controller may further determine whether the power tool 300 needs maintenance based on a change in motor current or the number of cutting times. For example, when the power tool 300 needs to be lubricated or the blade is worn, the motor current will increase. When the motor current is within a normal current range and exceeds a set maintenance current value, the controller will issue a maintenance reminder. When the cumulative number of cutting times exceeds the set value, the controller will issue the maintenance reminder.

A structure of the backpack assembly 100 in the backpack power supply device of the disclosure is not limited, and may be any suitable structure that can carry the power supply device on the operator's body, such as a hip belt 120, a strap, or a combination of the hip belt 120 and strap. Please refer to FIG. 5. In one embodiment, the backpack assembly 100 includes the hip belt 120 and a shoulder strap 130. The hip belt 120 is fixed around an operator's waist. The shoulder strap 130 includes a first shoulder strap located on one shoulder and a second shoulder strap located on the other shoulder. A first end of the first shoulder strap is connected with the hip belt 120 on a front side of an operator's left shoulder, a second end of the first shoulder strap is connected with the hip belt 120 on a back side of the operator's left shoulder, a first end of the second shoulder strap is connected with the hip belt 120 on a front side of an operator's right shoulder, and a second end of the second shoulder strap is connected with the hip belt 120 on a back side of an operator's right shoulder. A first buckle 160 is arranged on the hip belt 120 between the first shoulder strap and the second shoulder strap in front of the operator. The hip belt 120 may be opened through the first buckle 160, thereby forming a backpack structure that is easy to put on and take off.

Figure 5:
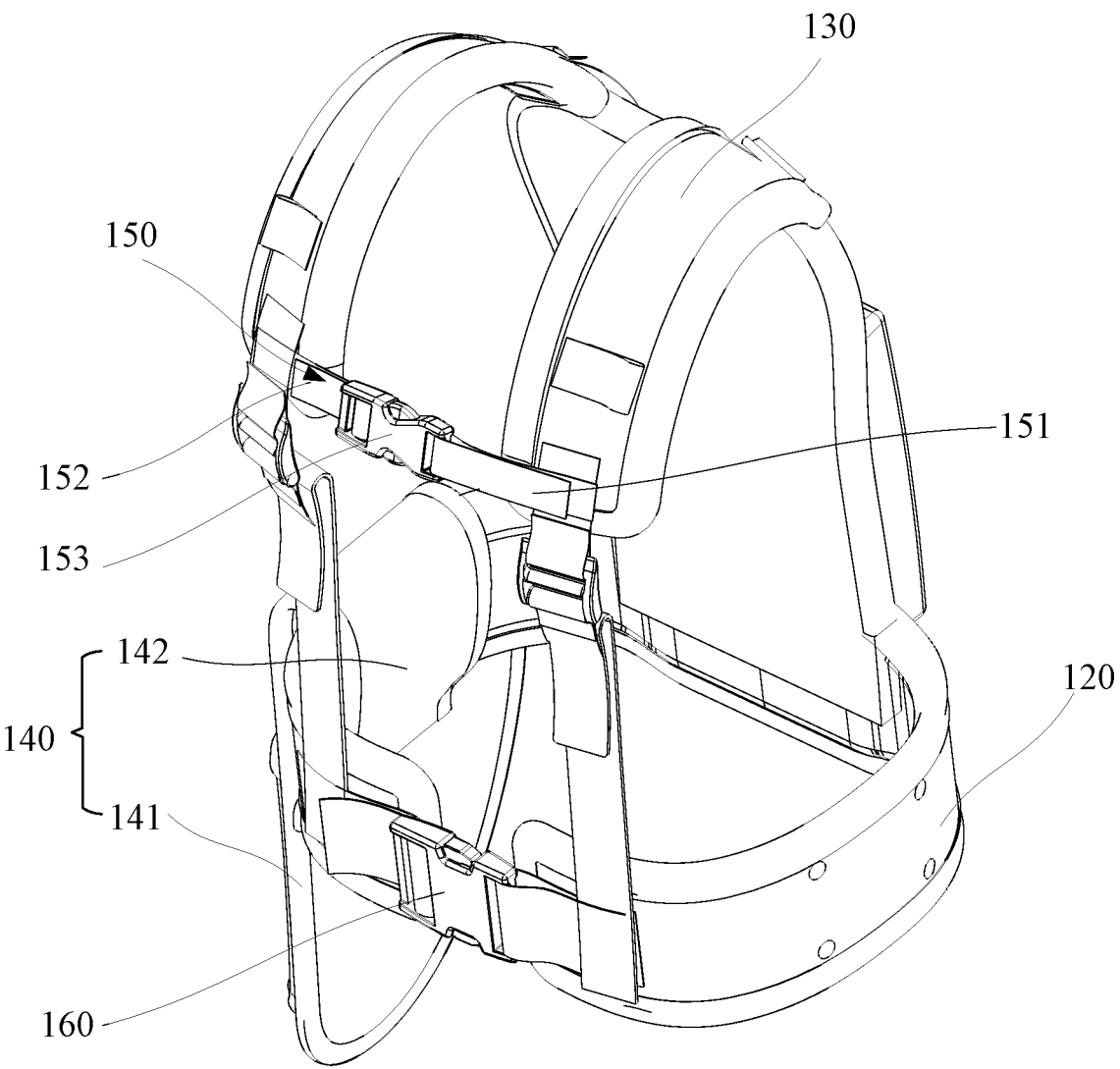
FIG. 5 is a structural view of a backpack assembly of the backpack power supply device according to an embodiment of the disclosure.

Please refer to FIG. 5. In one embodiment, the backpack assembly 100 further includes a sternum strap 150. The sternum strap 150 includes a first sternum strap 151 and a second sternum strap 152. The first sternum strap 151 and the second sternum strap 152 are respectively arranged on the first shoulder strap and the second shoulder strap of the shoulder strap 130 and may be connected through a second buckle 153. After the user puts on the backpack assembly 100, the power cable 200 may be fixed on an arm through the sternum strap 150 to prevent the power cable 200 from scratching branches during use.

Figure 6:
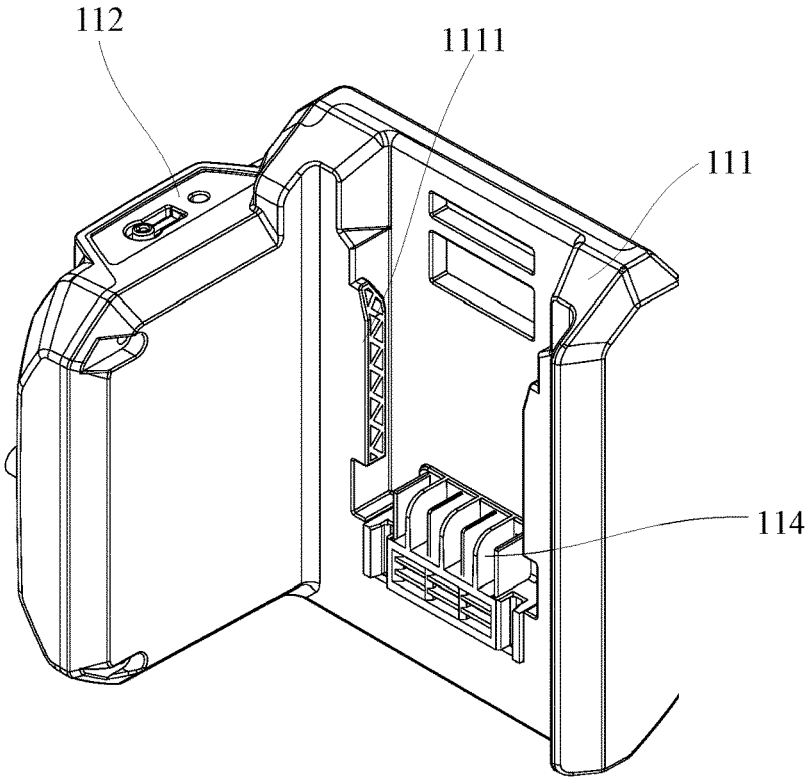
FIG. 6 is a perspective schematic view of the battery pack mounting base of the backpack power supply device according to an embodiment of the disclosure.

Please refer to FIG. 2, FIG. 3 and FIG. 6. In one embodiment, the backpack assembly 100 further includes a battery pack mounting base 110, and the control panel 500, the battery pack 400 and an end of the power cable 200 electrically connected with the battery pack 400 are mounted on the battery pack mounting base 110. The battery pack mounting base 110 is provided with a track 1111. A first end of the track 1111 is open, and a second end of the track 1111 is provided with an electrical terminal 114. The battery pack 400 is provided with a sliding structure and a locking structure matching the track 1111. The sliding structure is slidably connected with the track 1111 and electrically connected with the electrical terminal 114 after sliding into place. The locking structure locks the battery pack 400 in the track 1111.

Figure 4:
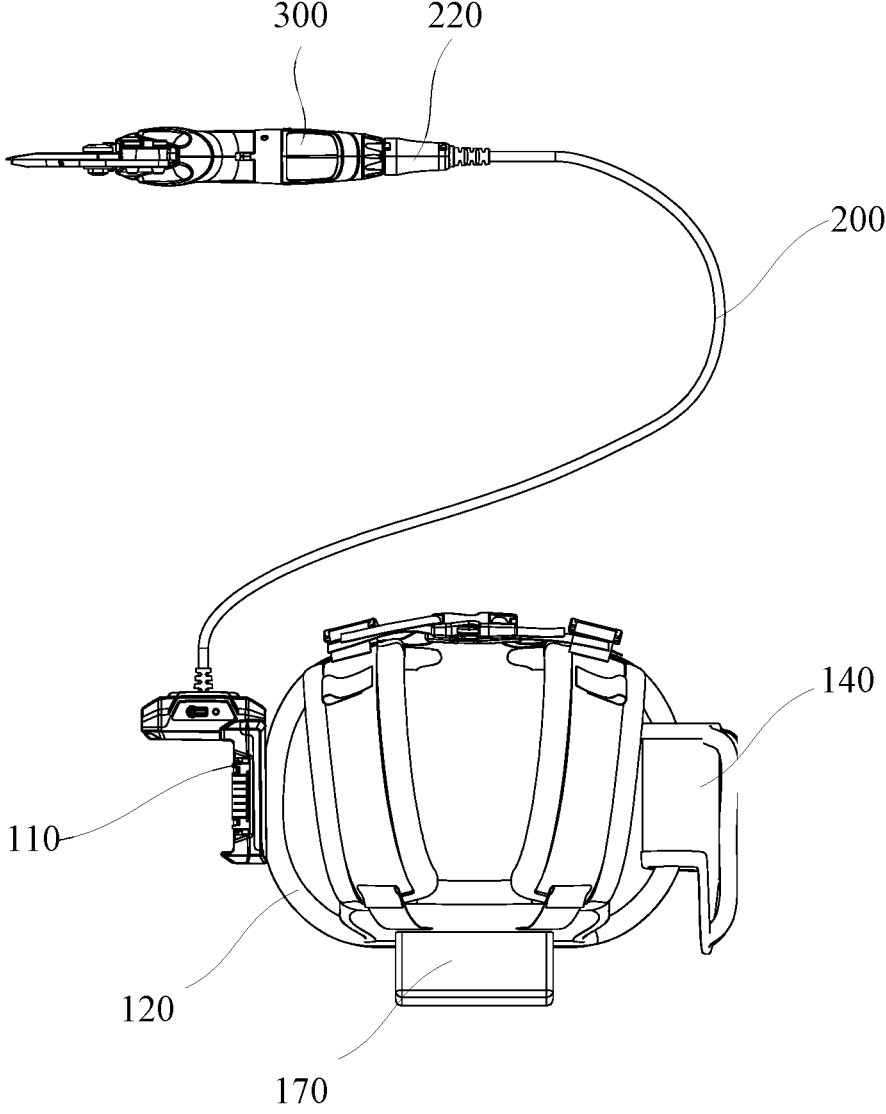
FIG. 4 is a top view of the backpack power supply device after it is connected with the power tool according to an embodiment of the disclosure.

Please refer to FIG. 3 and FIG. 4. In the backpack power supply device of the disclosure, a structure of the battery pack mounting base 110 and a mounting form on the backpack assembly 100 are not limited. In one embodiment, the battery pack mounting base 110 is detachably mounted on the hip belt 120 and is located on a left hand position of the operator. The hip belt 120 is provided with four connecting holes, and the battery pack mounting base 110 is fixed on the connecting holes through a connecting assembly. Arranging the battery pack mounting base 110 in a left hand position may prevent the operator from contacting an elbow joint when operating the power tool 300, which increases a stability of the device, and further prevent the operator from elbow injury.

Please refer to and FIG. 4. In one embodiment, the backpack assembly 100 further includes an accessory bag 170 arranged on an operator's back. The accessory bag 170 is a double zipper storage bag that may store small tool accessories used for trimming, as well as a spare battery pack 400, a charger, and sundries in a manual. In addition, considering a problem of placing the scissors when the operator uses both hands to arrange branches, in one embodiment, the backpack assembly 100 further includes a power tool storage cover 140 arranged on a side of the backpack assembly 100. The power tool storage cover 140 may be detachably mounted on the hip belt 120 on a right side of the operator. When the operator is arranging branches or walking and taking a rest, the power tool 300 in a hand may be shut down and put into a scissor cover. This not only effectively ensures an operator's own safety, but also the power tool storage cover 140 may well protect a trimmer trip of the power tool 300.

Please refer to and FIG. 5. In the backpack power supply device of the disclosure, a mounting form of the power tool storage cover 140 on the hip belt 120 is not limited and may be any suitable structural form. In one embodiment, the power tool storage cover 140 includes a storage bag 141, a soft connector 142 and a connecting component, and the soft connector 142 is wrapped around the hip belt 120 of the backpack assembly 100 and is connected with the storage bag 141 through the connecting component. The connecting component may be any suitable form that can securely connect the soft connector 142 with the storage bag 141, such as any one or more of snaps, buttons, and adhesive paste.

Please refer to and FIG. 2. In one embodiment, the power cable 200 is a six-core wire, and the connecting terminal is a six-pin plug 220. The corresponding power tool 300 is provided with a jack that matches the six-pin plug 220, wherein the six-pin plug 220 and the jack are provided with large and small ends, which may be used for assembly to foolproofing. An outer surface of the power cable 200 is orange and is provided with a fluorescent structure. The fluorescent structure may be a coating or pattern coated on the outer surface of the power cable, or may be fluorescent particles mixed in an outer insulation layer of the power cable. The power cable with fluorescent structure may allow users to greatly reduce a probability of accidentally cutting or hooking the power cable when working at night or in a dark environment. Three of the six pins in the power cable 200 may transmit a three-phase signal of a brushless motor in a scissors body, and the other three pins may transmit signals of the Hall plate in a body of the power tool 300 that controls an opening and closing of a trimming blade. The six-pin wire has high durability and may withstand tens of thousands of bends without breaking.

Please refer to FIG. 3. In one embodiment, the backpack power supply device further includes a Bluetooth assembly (not shown). The Bluetooth assembly is mounted on the control panel 500 and may be connected via Bluetooth to user interfaces such as mobile phones and computers. For example, if the operator has a My Power Tools APP installed on his mobile phone, he may use the APP to read relevant data such as the number of cutting times, fault history, blade grinding or replacement reminders, and maintenance reminders for an entire machine through the APP.

Please refer to FIG. 3. In one embodiment, the backpack power supply device further includes a first temperature sensor (not shown) for detecting a temperature of the control panel 500, and the first temperature sensor is electrically connected with the control panel 500. When a temperature detected by the first temperature sensor is abnormal, the control panel 500 sends an alarm signal. This structure may prevent the control panel 500 from burning due to excessive temperature, and may be pre-controlled in advance.

Please refer to FIG. 3. In one embodiment, the backpack power supply device further includes an alarm device (not shown), which is electrically connected with the control panel 500. The alarm device includes a buzzer and at least one warning light. When an abnormality occurs in the device, such as an abnormality in the first temperature sensor or motor current, the controller controls the buzzer to perform a sound reminder and controls different warning light groups to light up, so that the operator can determine a type of fault and carry out corresponding maintenance.

Please refer to FIG. 2 and FIG. 3. A connection mode between the power cable 200 and the battery pack mounting base 110 in the backpack power supply device of the disclosure may be a fixed connection or a detachable connection through the plug 220. In one embodiment of the disclosure, the power cable 200 is mounted on the battery pack mounting base 110 through a power cable double buckle mounting structure 210.

Please refer to FIG. 9 through FIG. 13. The power cable double buckle mounting structure 210 includes the power cable 200, a first clamping body 211 and a second clamping body 212. A type of the power cable 200 is not limited. In one embodiment of the disclosure, the power cable 200 is the six-pin wire. One end of the power cable 200 located at the connecting part is provided with a rubber clamping head 213. The rubber clamping head 213 is provided with a clamping groove 2131. The first clamping body 211 is provided with a first clamping structure that may be clamped from a first side of the clamping groove 2131. The second clamping body 212 is provided with a second clamping structure that may be clamped from a second side of the clamping groove 2131. Wherein, the first clamping body 211 and the second clamping body 212 are combined and clamped in the clamping groove 2131, and may be detachably fixed on the battery pack mounting base 110.

Please refer to FIG. 14 through FIG. 17. Structures of the first clamping structure and the second clamping structure in the disclosure are not limited, as long as they can be clamped into the clamping groove 2131 from both sides of the clamping groove 2131 respectively, and the rubber clamping head is positioned and clamped to be fixed along an extending direction of power cable 200. In one embodiment, the clamping groove 2131 includes a first side wall 21311, a second side wall 21312, and a connecting body 21313 connecting the first side wall 21311 and the second side wall 21312. The connecting body 21313 is provided with a circumferential anti-rotation structure matching the first clamping structure and/or the second clamping structure. The circumferential anti-rotation structure may prevent safety hazards of an electrical connection caused by twists in the power cable 200.

Please refer to FIG. 13 through FIG. 17. The circumferential anti-rotation structure in the disclosure may be any structure that can prevent the rubber clamping head from rotating between the first clamping body 211 and the second clamping body 212, for example, corresponding protrusions, groove structures, etc. are respectively provided on the connecting body 21313 and the corresponding clamping body. In one embodiment of the disclosure, the circumferential anti-rotation structure includes at least one matching plane provided on the connecting body 21313 to be matched with the first clamping body 211 and/or the second clamping body 212. In one embodiment of the disclosure, the connecting body 21313 is provided with a rectangular cross-section, and four matching planes 213131 are provided on its outer wall. The first clamping structure is provided with a first anti-rotation plane 2114, and the second clamping structure is provided with a second anti-rotation plane 2123. After the first clamping body 211 and the second clamping body 212 are assembled, an accommodating cavity 216 matching the connecting body 21313 is formed between the first clamping body 211 and the second clamping body 212, and the first anti-rotation plane 2114 and second anti-rotation plane 2123 are respectively provided on side walls of the accommodating cavity 216, and are correspondingly fitted with the four matching planes 213131.

Please refer to FIG. 14 through FIG. 17. In order to reduce a difficulty of assembly, the first clamping body 211 and the second clamping body 212 can form a whole body after being clamped into the clamping groove 2131. In an embodiment of the disclosure, connecting surfaces of the first clamping body 211 and the second clamping body 212 are provided with a plug-in structure. The plug-in structure not only enables a matching of the circumferential anti-rotation structure to be more stable, but also enables the first clamping body 211 and the second clamping body 212 to form an overall structure surrounding the clamping groove 2131, which increases a mounting stability of the first clamping body 211 and the second clamping body 212 on the battery pack mounting base 110.

Please refer to FIG. 14 through FIG. 17. The above-mentioned plug-in structure in the disclosure may be any suitable structure that can realize a plug-in connection between the first clamping body 211 and the second clamping body 212. In one embodiment of the disclosure, the plug-in structure includes protrusions and concave grooves 2122 matched with the protrusions. The protrusions and the concave grooves 2122 are respectively provided on matching surfaces on two sides of a splicing seam 215. For example, in one embodiment of the disclosure, the protrusions are provided on corresponding first matching surface 2111 of the first clamping body 211. The concave grooves 2122 are correspondingly provided on a second matching surface 2121 of the second clamping body 212.

Figure 15:
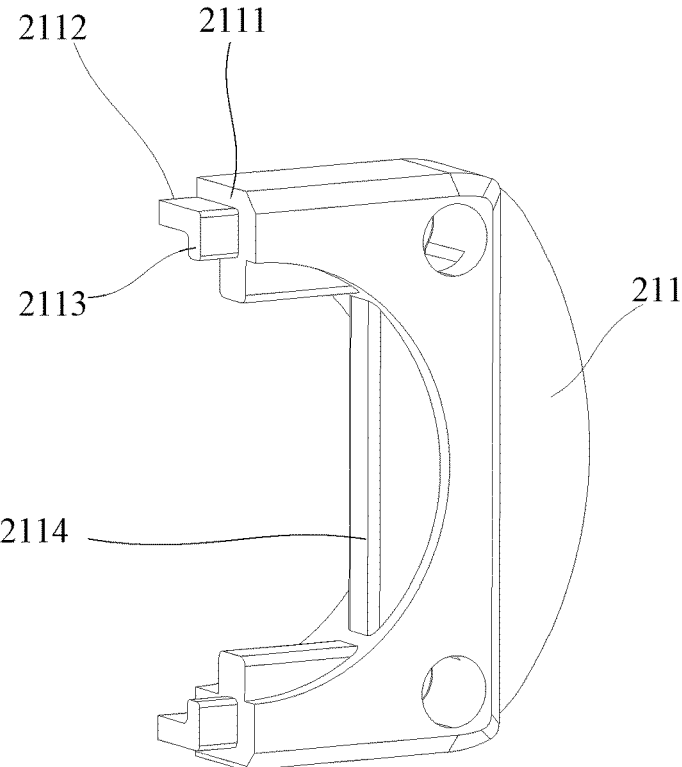
FIG. 15 is a structural view of the second clamping body of the backpack power supply device according to an embodiment of the disclosure.
Figure 16:
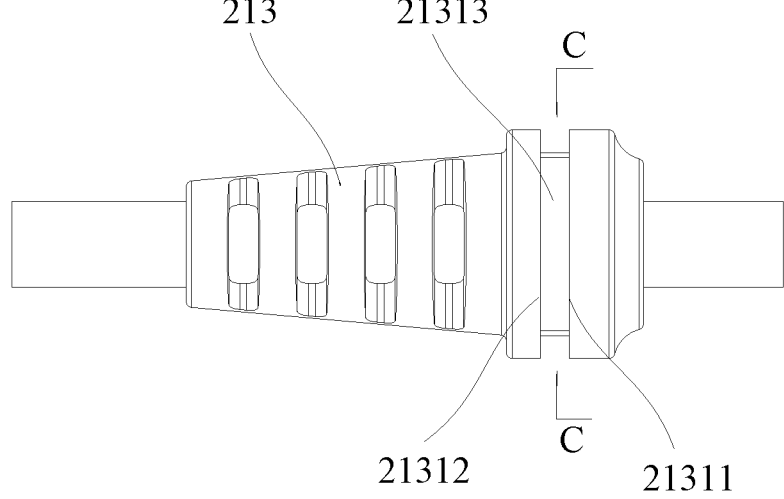
FIG. 16 is a structural view of a rubber clamping head of the backpack power supply device according to an embodiment of the disclosure.
Figure 17:
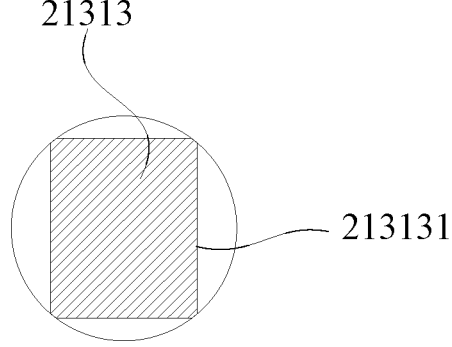
FIG. 17 is a cross-sectional view along a C-C direction in FIG. 16.

Please refer to FIG. 15. In the disclosure, structures of the protrusions and the concave grooves 2122 are not limited as long as they can be matched with each other correspondingly. However, in one embodiment of the disclosure, the protrusion includes a first protruding part 2113 and a second protruding part 2112 that are intersectingly connected. Extending directions of the first protruding part 2113 and the second protruding part 2112 intersect with each other. The first protruding part 2113 extends in a direction perpendicular to the power cable 200, and the second protruding part 2112 extends in a direction parallel to the power cable 200. This arrangement may realize an insertion and positioning of the first clamping body 211 and the second clamping body 212 in two directions, thereby increasing a stability of the insertion of the first clamping body 211 and the second clamping body 212.

Figure 7:
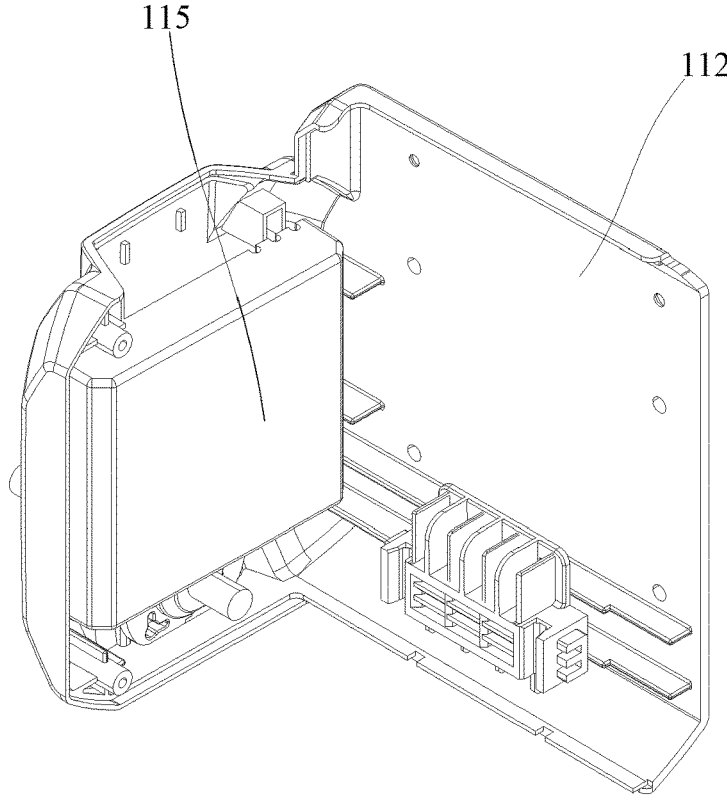
FIG. 7 is a schematic view of the battery pack mounting base of the backpack power supply device after removing a first housing according to an embodiment of the disclosure.
Figure 8:
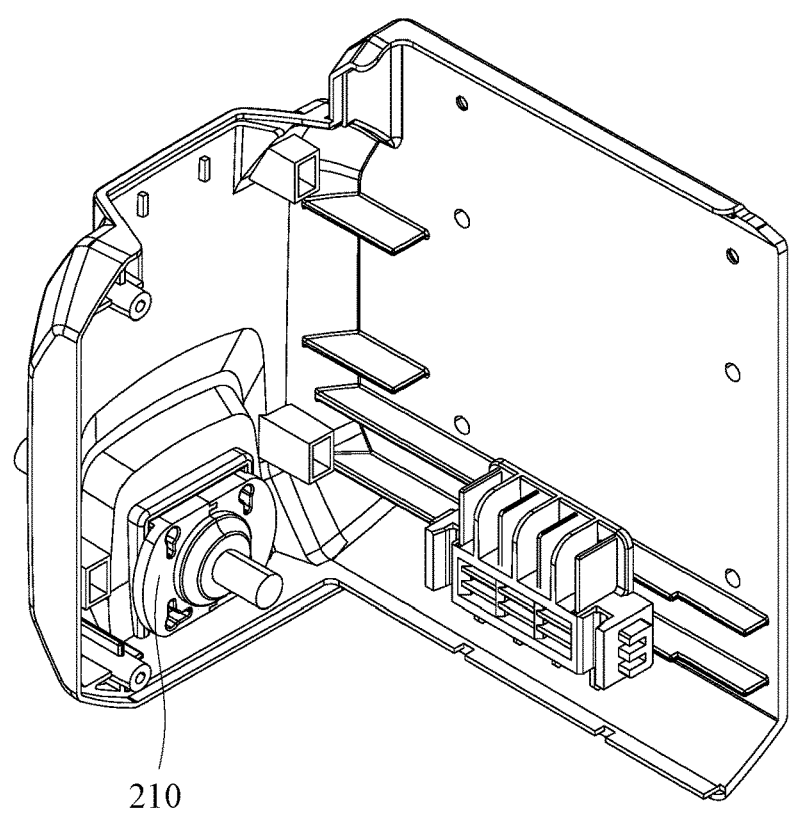
FIG. 8 is a schematic view of the battery pack mounting base of the backpack power supply device after removing the first housing and the control panel cover according to an embodiment of the disclosure.
Figure 9:
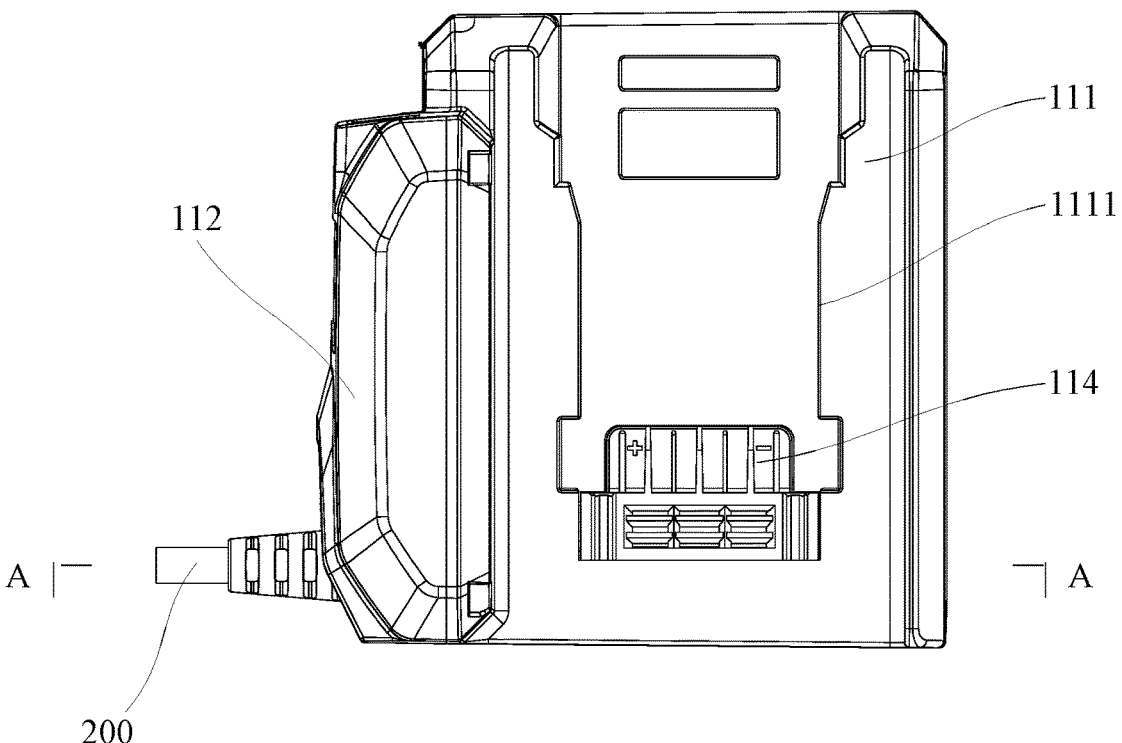
FIG. 9 is a front view of the battery pack mounting base of the backpack power supply device according to an embodiment of the disclosure.
Figure 10:
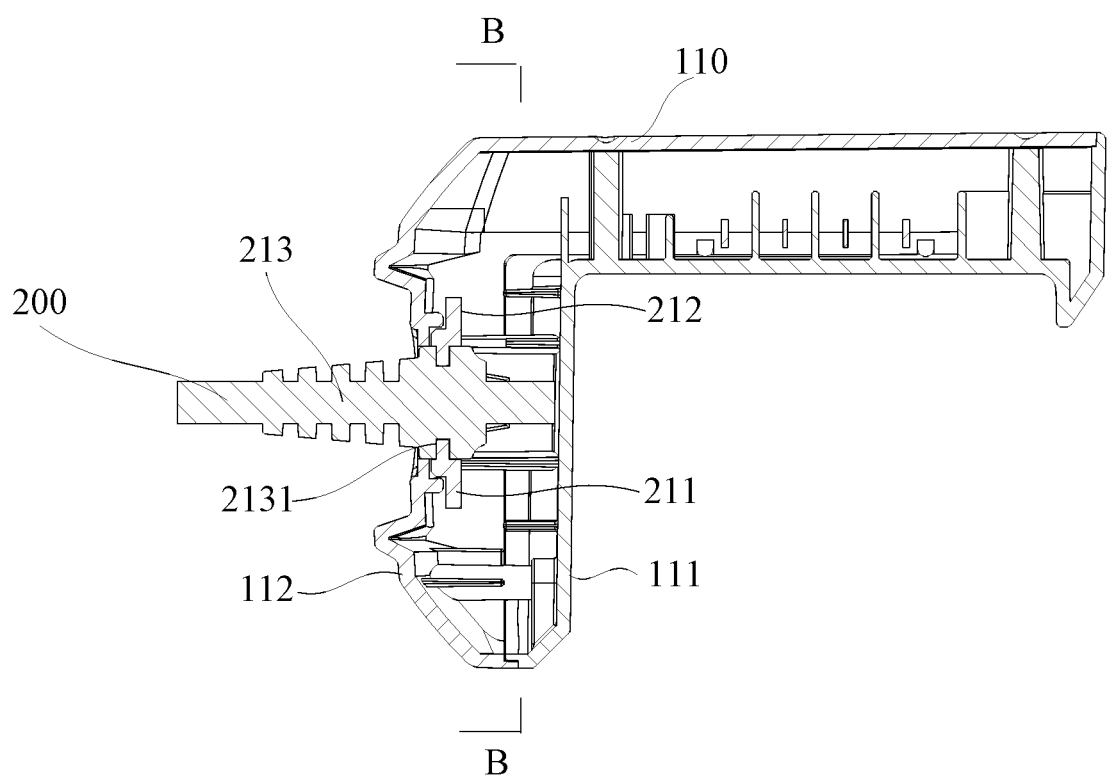
FIG. 10 is a cross-sectional view along a line A-A in FIG. 9.
Figure 11:
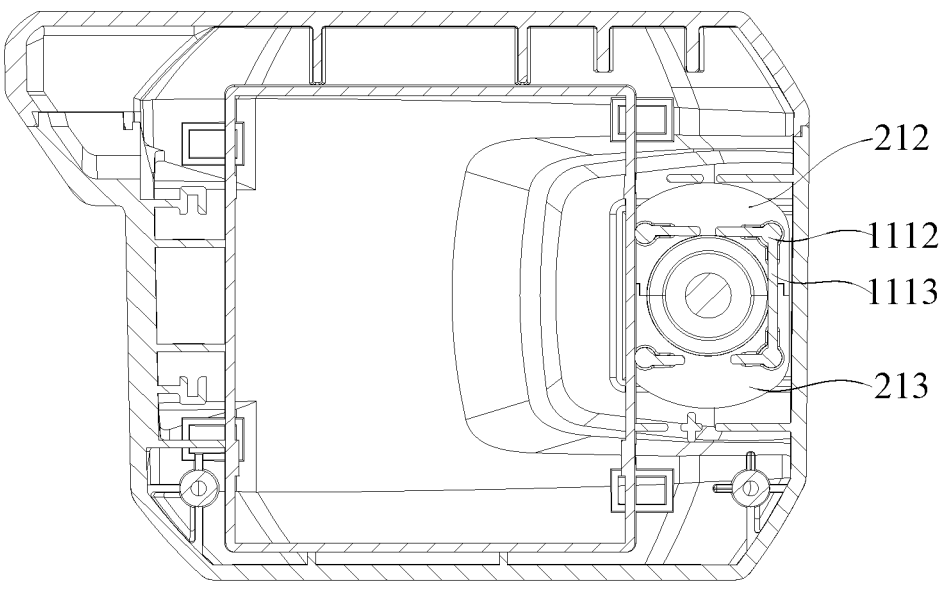
FIG. 11 is a cross-sectional view along a line B-B in FIG. 10.
Figure 12:
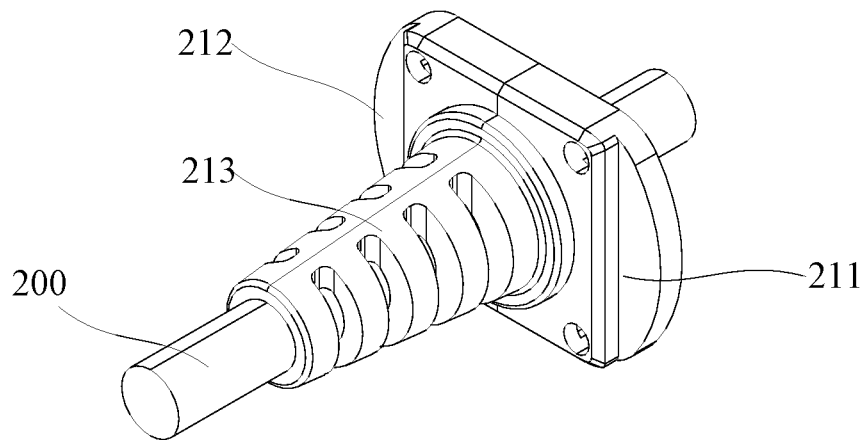
FIG. 12 is a schematic structural view of one end of a power cable connected with the battery pack mounting base of the backpack power supply device according to an embodiment of the disclosure.
Figure 13:
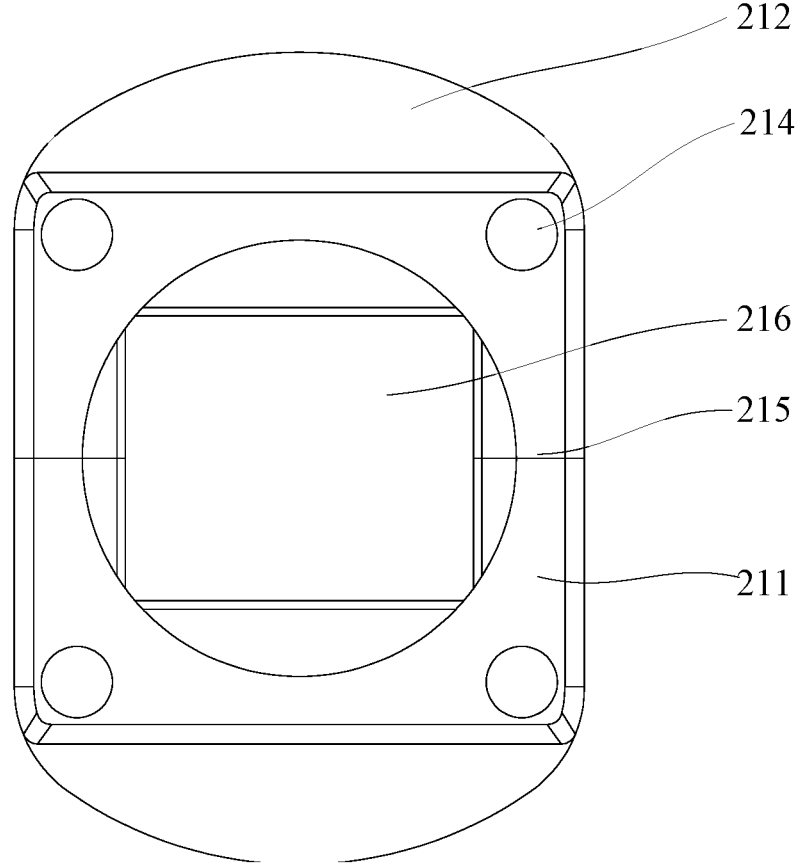
FIG. 13 is a schematic structural view of a first clamping body and a second clamping body of the backpack power supply device after the clamping body clamped together according to an embodiment of the disclosure.
Figure 14:
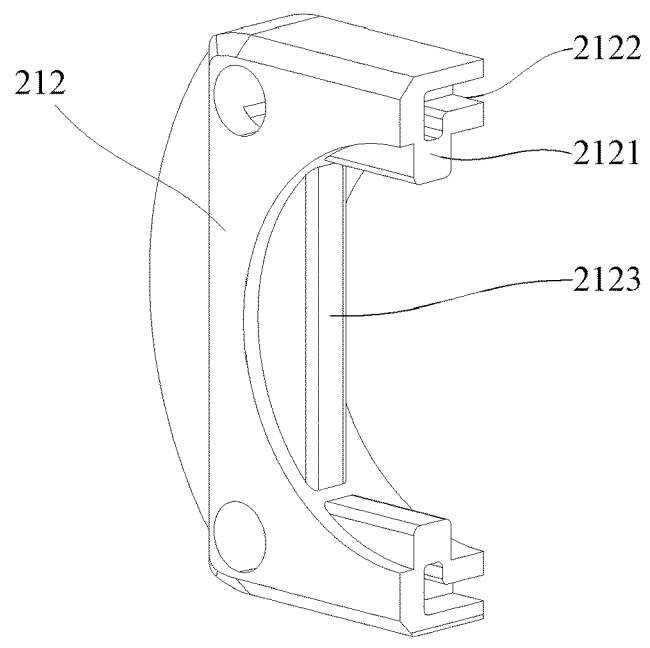
FIG. 14 is a structural view of the first clamping body of the backpack power supply device according to an embodiment of the disclosure.

Please refer to FIG. 6 through FIG. 8. The structure of the battery pack mounting base 110 in the disclosure is not limited. In one embodiment, a housing of the battery pack mounting base 110 includes a first housing 111 and a second housing 112. The first housing 111 and the second housing 112 is detachably connected and forms a mounting cavity. The control panel 500 is mounted in the mounting cavity. A control panel cover 115 is arranged outside the control panel 500. The first clamping body 211 and the second clamping body 212 may also be detachably mounted into the mounting cavity, and clamp and fix the rubber clamping head 213 in the mounting cavity. The power cable 200 is electrically connected with corresponding terminals of the control panel 500 and the battery pack 400 which are arranged in the mounting cavity.

Please refer to FIG. 10 through FIG. 13. In the backpack power supply device of the disclosure, the first clamping body 211 and the second clamping body 212 may be mounted on the battery pack mounting base 110 through a bolt connection, a snap connection, etc. In one embodiment of the disclosure, the first housing 111 is provided with a positioning column 1112. The first clamping body 211 and the second clamping body 212 are provided with positioning holes 214 matching the positioning columns 1112. The first clamping body 211 and the second clamping body 212 are sleeved and mounted on the positioning column 1112 through the positioning holes 214, and the second housing 112 presses and mount the first clamping body 211 and the second clamping body 212 on the first housing 111. A reinforcing rib 1113 is provided at a root part of the positioning column 1112, and a blocking surface is provided on the reinforcing rib 1113. The first clamping body 211 and the second clamping body 212 are provided with a groove to avoid the reinforcing rib 1113. A bottom of the groove abuts against the blocking surface, thereby enabling a mounting of the first clamping body 211 and the second clamping body 212 to be more stable.

Figure 18:
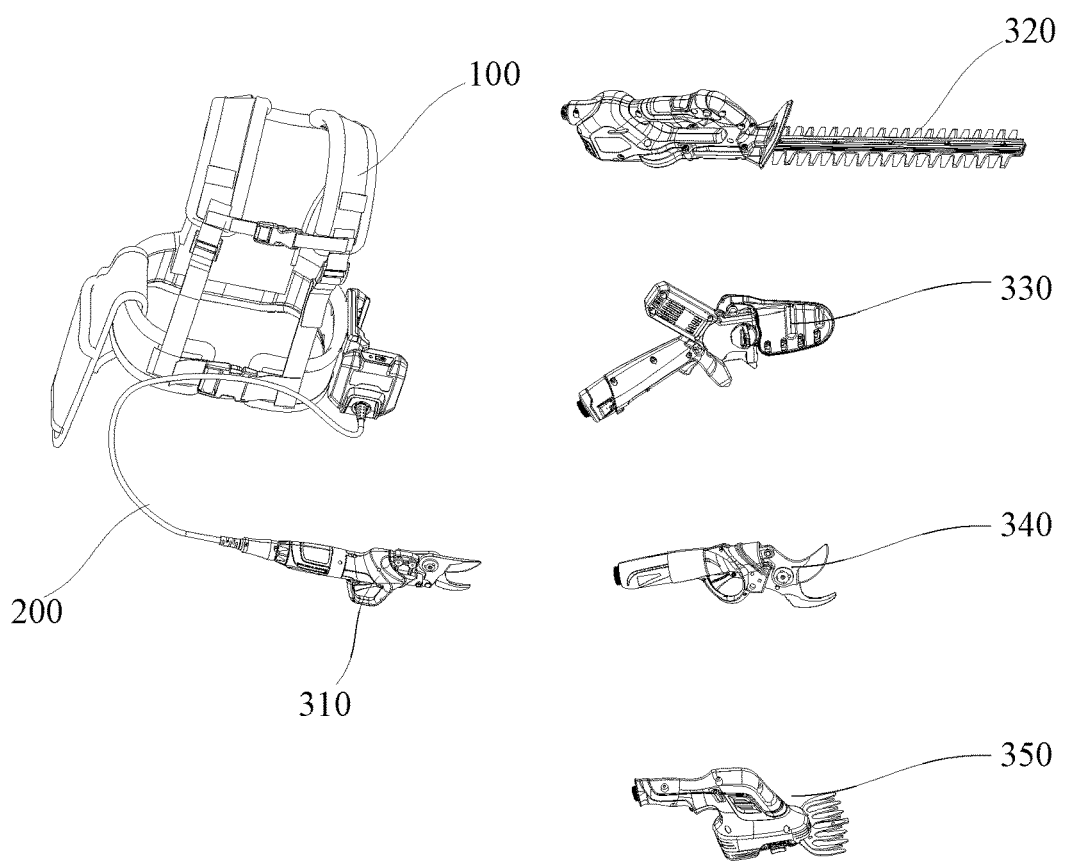
FIG. 18 is a schematic view of a backpack tool system according to an embodiment of the disclosure.

Please refer to FIG. 18. The backpack tool system of the disclosure includes one or more power tools 300. The power tool 300 may be any one of a 35 mm garden shear 310, a single-handed hedge trimmer 320, a small hand saw 330, a 45 mm garden shear 340, a grass trimmer 350 or a hedge trimmer 360. And a motor and trimming driving structure are mounted inside the body of the power tool. The power cable 200 is provided with only one connecting terminal. Each power tool 300 is provided with a port that is inter-changeably electrically connected with the connecting terminal, and may be electrically connected with the connecting terminal through the port.

Please refer to FIG. 19 through FIG. 23. Taking the hedge trimmer 360 as an example, in this embodiment, the hedge trimmer 360 includes a casing 361, a motor 362, a trans-mission gear set (not marked in the figure), a gearbox 363, a blade assembly 364 and a control component 365. Wherein, the motor 362 is mounted in the casing 361 to provide power for the blade assembly 364. The transmission gear set is mounted in the casing 361 and is in a transmission connection with the motor 362. The gearbox 363 is mounted at a bottom of the casing 361 for placing the transmission gear set. The blade assembly 364 is partially mounted in the gearbox 363 and is in a transmission connection with the transmission gear set. The control component 365 is mounted inside the casing 361 and is used to control a starting and stopping of the motor 362.

Figure 19:
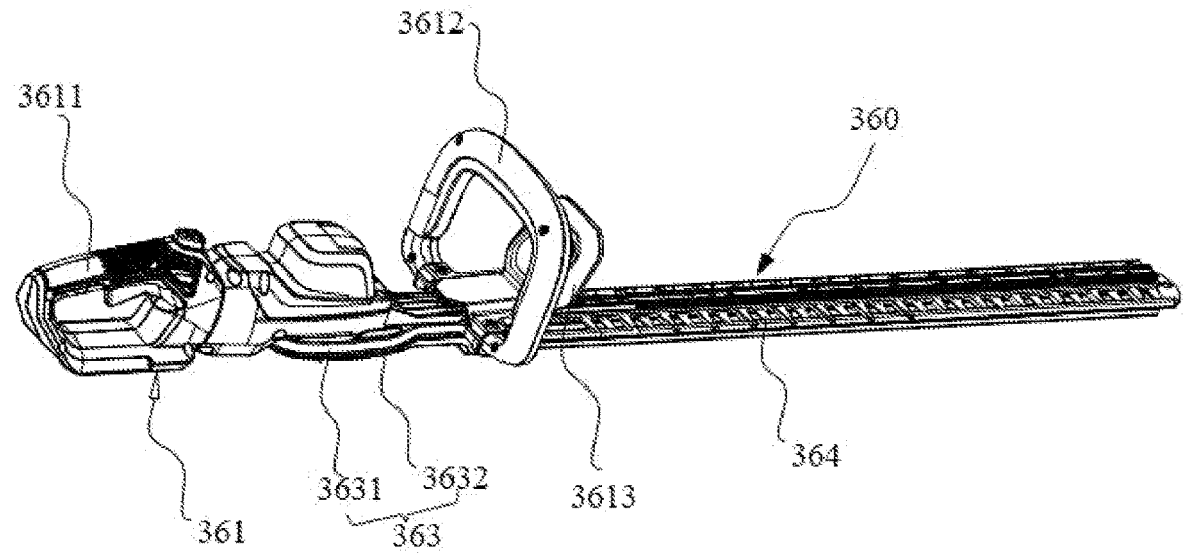
FIG. 19 is a schematic structural view of the power tool of the backpack tool system according to an embodiment of the disclosure.

Please refer to FIG. 19. The casing 361 includes two mutually matching housings, and the two housings are spliced relative to each other to form an empty cavity structure. An end of the casing 361 away from the blade assembly 364 is hollowed to form a rear handle 3611. A bottom of the rear handle 3611 is provided with a port (not shown in the figure) electrically connected with the motor 362. The connecting terminal of the power cable 200 of the backpack power supply device is inserted into the port to achieve an electrical connection with the hedge trimmer 360 to provide power for the hedge trimmer 360. In this embodiment, a length direction of the rear handle 3611 is substantially parallel to an extending direction of the blade assembly 364. The casing 361 is fixed with an auxiliary handle 3612 at a position where the blade assembly 364 extends out of the casing, which ensures a convenience of a worker holding the device. In some embodiments, a guard 3613 is mounted on the casing 361 and is located at a position where the blade assembly 364 extends out of the gearbox 363. A protective plate of the guard 3613 is inclined toward the direction in which the blade assembly 364 extends. When the user uses the hedge trimmer 360, it may avoid opera-tional errors that may cause the user to touch the blade, thereby improving safety.

Figure 20:
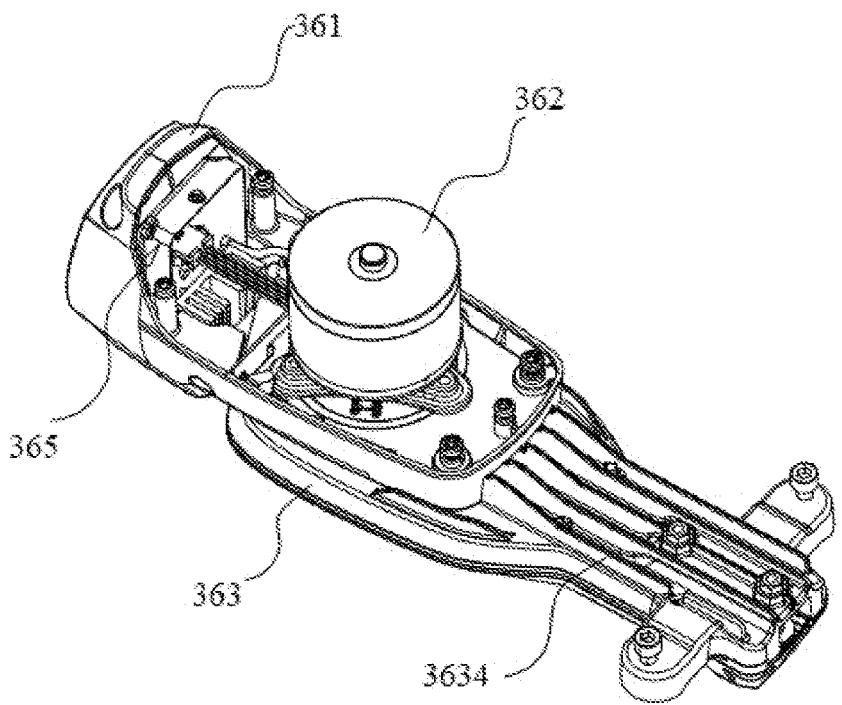
FIG. 20 is a partial structural view of the power tool of the backpack tool system according to an embodiment of the disclosure.
Figure 21:
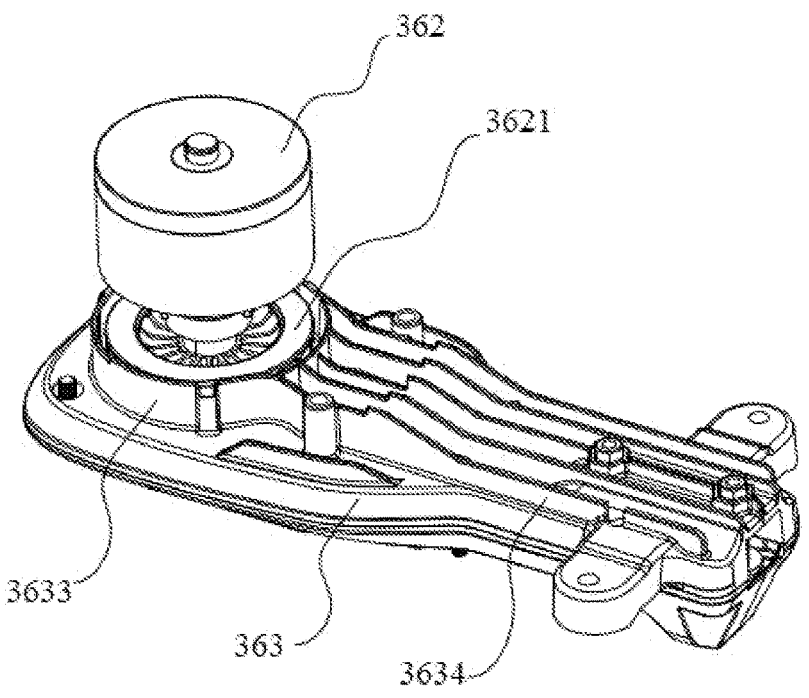
FIG. 21 is a schematic structural view of a motor in the power tool of the backpack tool system according to an embodiment of the disclosure.
Figure 23:
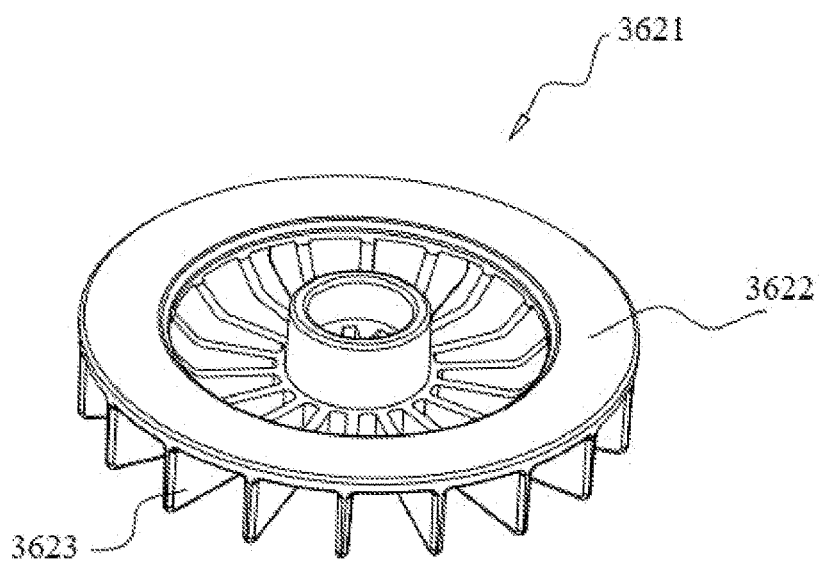
FIG. 23 is a schematic structural view of a blower fan in the power tool in an embodiment of the backpack tool system according to an embodiment of the disclosure.

Please refer to FIG. 20, FIG. 21 and FIG. 23. In one embodiment, the motor 362 of the hedge trimmer 360 is an external rotor motor. An output shaft of the motor 362 is arranged vertically and is arranged perpendicularly to the extending direction of the blade assembly 364 of the hedge trimmer 360. A blower fan 3621 is coaxially fixed on the output shaft of the motor 362 and is located between the motor 362 and the gearbox 363. Fan blades 3623 of the blower fan 3621 are straight fan blades, and a plane of the fan blades 3623 and its rotating surface are arranged perpendicularly to each other, which may achieve a best blowing effect. A wind blocking board 3622 is integrally formed on a side of the blower fan 3621 close to the motor 362, and the wind blocking board 3622 is located at a periphery of the fan blade 3623. The wind blocking board 3622 may limit a flow direction of airflow in the blower space and reduce situations where the airflow stays on an upper side of the blower fan 3621.

Please refer to FIG. 19 through FIG. 22. In one embodiment, the gearbox 363 includes an upper housing 3631 and a lower housing 3632. The upper and lower housings are fixedly connected with each other by bolts and form an empty cavity. The transmission gear set is arranged in the empty cavity. A side of the gearbox 363 away from the motor 362 in a length direction is open and used for inserting the blade assembly 364. The entire gearbox 363 is made of metal, has good structural strength and heat dissipation performance, and may provide a mounting environment for the blade assembly 364. The gearbox 363 is attached to the casing 361 and is partially exposed to air to facilitate a heat dissipation of the gearbox 363. A blower space 3633 matching a shape of the blower fan 3621 is formed on an outer top wall of the upper housing 3631. The blower space 3633 is used to accommodate the blower fan 3621. The blower space 3633 is closed on all sides and opens on a top, and an open side of the blower space 3633 is in contact with a bottom wall of the casing 361, so that the blower space 3633 forms a relatively closed space, which may avoid heat in the blower space 3633 interacting with the gearbox 363 is conducted into the casing 361. There is a gap between a bottom wall of the blower space 3633 and the blower fan 3621 to avoid interference when the blower fan 3621 rotates synchronously with the output shaft of the motor 362.

Please refer to FIG. 20 and FIG. 21. A plurality of heat dissipation pieces 3634 are provided on a top of the gearbox 363. A first end of the heat dissipation piece 3634 is connected with a side wall of the blower space 3633, and a second side is exposed to the air. This allows the heat on the side wall of the blower space 3633 to be conducted to the air through the heat dissipation pieces 3634, further improving a heat dissipation effect. In order to further improve the heat dissipation effect, heat dissipation pieces 3634 may also be provided at a bottom of the gearbox.

Figure 22:
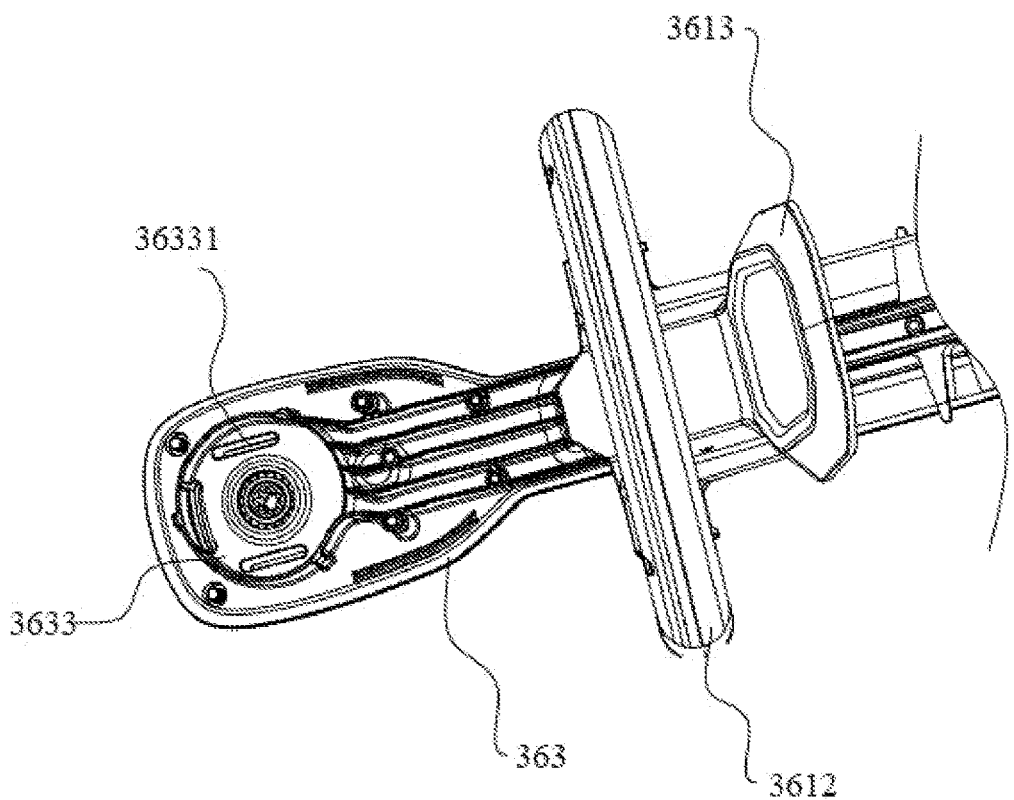
FIG. 22 is a schematic structural view of a blower space of the power tool in an embodiment of the backpack tool system according to an embodiment of the disclosure.

Please refer to FIG. 22. A ventilation hole 36331 is provided on the bottom wall of the blower space 3633 and vertically penetrates the gearbox 363 to communicate with an outside. In this embodiment, three ventilation holes 36331 are provided on the bottom wall of the blower space 3633, and the three ventilation holes 36331 are arranged along a periphery of the bottom wall of the blower space 3633. In actual work, a large amount of heat is generated when the motor 362 and a transmission mechanism operate at a high speed. The gearbox 363 wrapping outside the transmission gear set may prevent lubricating oil in the transmission mechanism from contaminating the motor and other components. When the motor is running, the blower fan 3621 rotates synchronously with the output shaft of the motor 362, and drives the air in the blower space 3633 to be discharged outward through the ventilation holes 36331. This process will take away the heat on the motor 362 and the gearbox 363, which improves heat dissipation efficiency of this device.

Please refer to FIG. 19 and FIG. 20. The control component 365 of the hedge trimmer 360 includes a switch assembly (not labeled in the figure). The switch assembly is mounted at a position of the rear handle 3611, and the switch assembly is electrically connected with the control panel 500 of the backpack power supply device. The control panel 500 may control the starting and stopping of the motor 362 according to a signal transmitted by the switch assembly. It should be noted that the structure of the power tool 300 that is not described in detail in the disclosure may be the same or similar to conventional power tools, and will not be described in detail.

Please refer to FIG. 3 and FIG. 18. In one embodiment, the backpack tool system includes a plurality of power tools 300. For example, the backpack tool system includes a first tool and a second tool. The first tool and the second tool are configured to be electrically connected with the backpack power supply through the power cable 200. At least one of the first tool and the second tool is controlled by the control panel 500. A control between the control panel 500 and the first tool and/or the second tool may be achieved through various ways. For example, a control signal of the control panel 500 is transmitted to the first tool or the second tool through the power cable 200, or the control signal of the control panel 500 is transmitted to the first tool or the second tool through a wireless connection. When the first tool or the second tool is connected (both wired connection and wireless connection are acceptable) with the backpack power supply device, the control panel 500 receives the signal transmitted by the first tool or the second tool to identify the first tool or the second tool, and controls its operation based on a type of the first tool or the second tool.

In an embodiment of the backpack tool system of the disclosure, the memory of the backpack power supply device contains operating mode parameters of at least one tool, and the control panel 500 retrieves the operating mode parameters based on the type of the first tool or the second tool to control its operation. For example, the memory stores powerful working mode parameters of the first tool, energy-saving working mode parameters of the first tool, powerful working mode parameters of the second tool, and energy-saving working mode parameters of the second tool. When the control panel 500 receives the signal of the first tool (or the second tool), and the type of the first tool (or the second tool) is recognized, the powerful working mode parameters of the first tool (powerful working mode parameters of the second tool) and the energy-saving working mode parameters of the first tool (energy-saving working mode parameters of the second tool) may be retrieved according to an operator's choice. When the powerful working mode parameters are selected, the control panel 500 controls an output current and output power of the battery pack 400 to be at larger values, thereby providing greater power for the power tool. When the energy-saving working mode parameters are selected, the control panel 500 controls the output current and output power of the battery pack 400 to be at smaller values, thereby consuming less electric energy while meeting cutting requirements.

In one embodiment of the backpack tool system of the disclosure, the backpack tool system is provided with a wireless communication module, and the backpack tool system is connected with an external intelligent device through the wireless communication module. The external intelligent device is equipped with a display device that can display a working state of the backpack tool system. The external intelligent device may be, for example, a smart phone or a computer, and the wireless communication module is a Bluetooth component. The Bluetooth component is installed on the control panel 500 and may be connected via Bluetooth to user interfaces such as mobile phones and computers.

Please refer to FIG. 1. In the backpack tool system of the disclosure, a locking structure is provided at a connection between a common port and a common connecting terminal. The locking structure may be any suitable structure that can prevent the power cable 200 from being separated from the plug 220 of the power tool 300. In an example of the disclosure, the housing of the power tool 300 is provided with external threads, and a locking nut 221 is rotatably mounted on an outside of the plug 220 of the power cable 200. After the power cable 200 is plugged into the power tool 300, the locking nut 221 is threadedly connected with the external thread. The locking structure may ensure that the power cable 200 will not loosen and cause abnormal conditions during operation.

Please refer to FIG. 3 and FIG. 18. In an embodiment of the backpack tool system of the disclosure, the backpack power supply device further includes a first temperature sensor (not shown) for detecting a temperature of the control panel 500 and a second temperature sensor for detecting a temperature of the motor in the power tool 300 (not shown). The control panel 500 and the first temperature sensor are mounted in the housing of the battery pack mounting base 110 to detect a temperature of a motherboard. The second temperature sensor is mounted in the body of the power tool 300 to detect a temperature of the motor in the body of the power tool 300. When the common port and the common connecting terminal are electrically connected, the second temperature sensor is electrically connected with the control panel 500 and transmits temperature information to the control panel 500. In an embodiment of the backpack tool system of the disclosure, only when the temperature detected by the first temperature sensor is abnormal, the control panel 500 sends an alarm signal and causes an alarm light of the control panel 500 to flash to give an alarm. In another embodiment of the backpack tool system of the disclosure, when the temperature detected by the second temperature sensor is abnormal, the control panel 500 sends the alarm signal and causes an alarm light of the motor to flash to give the alarm. It may be understood that when the temperatures detected by the first temperature sensor and the second temperature sensor are abnormal, the control panel 500 sends the alarm signal, causing the alarm light of the control panel 500 and the alarm light of the motor to flash at the same time. Considering that it is less likely that the temperature of the control panel 500 and the temperature of the motor will be abnormal at the same time, in some other embodiments, a corresponding alarm may also be issued through one alarm light with different flashing states.

Please refer to FIG. 1, FIG. 3 and FIG. 18. The disclosure further provides a control method of the backpack power supply device. The control method may provide matching voltage and current output for power tools 300 of different specifications through the same power supply device, which greatly improves a versatility of the power supply device.

The above control method includes the following process: providing a backpack assembly 100, the backpack assembly 100 being equipped with the control panel 500, the battery pack 400, the memory and the connecting terminal electrically connected with the control panel 500 and the battery pack 400 respectively;

providing a plurality of power tools 300, each power tool 300 being provided with a port for interchangeable electrical connection with the connecting terminal;

Wherein, when the connecting terminal is electrically connected with the port, the control panel 500 retrieves corresponding power supply parameters in the memory according to relevant information of the motor in the power tool 300 to control the battery pack 400 to provide a matching power supply to the motor.

In an embodiment of the control method of the disclosure, the control method further includes following process: the control panel 500 determining and recording a number of cutting times of shears based on changes in the motor current in the power tool 300. The control panel 500 reads a current value of the motor in the power tool 300, records current changes through the memory when the scissors are cutting, and determines and records the number of cutting times of the shears based on the number of waveforms of current changes. After replacing a blade of the power tool 300, when the cumulative number of cutting times exceeds the set value, the controller issues the reminder for blade grinding or replacement.

In an embodiment of the control method of the disclosure, the control method further includes following process: when the motor current in the power tool 300 exceeds a set current range, the control panel 500 sending an alarm signal. The operator may replace the blade or perform maintenance work accordingly.

In an embodiment of the control method of the disclosure, the control method further includes following process: collecting the temperature of the motor and/or control panel 500 and sending the alarm signal when the temperature exceeds a set threshold. After receiving the alarm signal, the operator may perform maintenance on the device in time to prevent damage to the control panel 500 or the motor due to excessive temperature.

It should be noted that parts not described in detail in the disclosure, such as the motor and trimming driving structure in the power tool, may be structures commonly used in all conventional garden power tools, and will not be described again here.

In summary, the backpack power supply device of the disclosure is provided with at least one connecting terminal that may be electrically connected with multiple power tools. One backpack power supply device may be applied to multiple power tools, has strong versatility, and saves users' cost of the replacement and maintenance, and a size of the battery pack is not limited by the casing of the power tool, so the battery pack may provide sufficient power and have a long battery life. In the backpack tool system of the disclosure, both the control panel and the battery pack are mounted on the backpack assembly outside the body of the power tool, which may enable the body structure of the power tool to be more compact, reduce a body size and weight of the power tool, and reduce difficulty and fatigue of operators when operating the power tool with one hand. Moreover, the backpack tool system of the disclosure has good heat dissipation, low failure rate, long battery life and long duration life. The control method of the power supply device of the disclosure may provide matching electric energy output for power tools of different specifications through the same power supply device, which greatly improves the versatility of the power supply device. Therefore, the disclosure effectively overcomes some practical problems in the prior art and has high utilization value and usage significance.

The above embodiments only illustrate principles and effects of the disclosure, but are not intended to limit the disclosure. Anyone familiar with this technology may modify or change the above embodiments without departing from a scope of the disclosure. Therefore, all equivalent modifications or changes made by those with ordinary knowledge in the technical field without departing from the technical ideas disclosed in the disclosure shall still be covered by the claims of the disclosure.

What is claimed is:

1. A backpack power supply device, comprising:
a backpack assembly;
a battery pack, arranged on the backpack assembly;
a control panel, arranged on the backpack assembly and electrically connected with the battery pack, and
a power cable, a first end of the power cable being electrically connected with the battery pack and the control panel, a second end of the power cable being provided with at least one connecting terminal that is capable of being electrically connected to a plurality of power tools, and the plurality of power tools being capable of adjusting an operating state according to a signal received from the control panel.

2. The backpack power supply device according to claim 1, further comprising a memory, wherein
the memory is capable of storing at least one of operating mode parameters, operating states, battery pack operating parameters, fault information, and usage data of the power tool.

3. The backpack power supply device according to claim 1, wherein
the backpack assembly comprises a battery pack mounting base, and the control panel, the battery pack and the power cable are all arranged on the battery pack mounting base.

4. The backpack power supply device according to claim 3, wherein
the battery pack mounting base is provided with a track, a first end of the track is open, a second end of the track is provided with an electrical terminal, the battery pack is slidably connected with the track and is electrically connected with the electrical terminal after sliding into place.

5. The backpack power supply device according to claim 3, wherein
the backpack assembly further comprises a hip belt and a shoulder strap, the hip belt is connected through a buckle, and the battery pack mounting base is capable of being detachably connected to a left hand position of the hip belt.

6. The backpack power supply device according to claim 1, further comprising a first temperature sensor to detect a temperature of the control panel, wherein
the first temperature sensor is electrically connected with the control panel.

7. The backpack power supply device according to claim 1, wherein
the backpack assembly further comprises a sternum strap to fix the power cable to the backpack assembly.

8. A backpack tool system, comprising:
a backpack power supply device, and
a power tool, provided with a body and a motor inside the body;
wherein, the backpack power supply device comprises a backpack assembly, a battery pack, a control panel and a power cable, the battery pack and the control panel are arranged on the backpack assembly, the control panel is electrically connected with the battery pack, a first end of the power cable is electrically connected with the battery pack and the control panel, a second end of the power cable is electrically connected with power tool, the second end of the power cable that is electrically connected with the power tool is provided with at least one connecting terminal that is capable of being electrically connected with a plurality of the power tools, and the power tool being capable of adjusting an operating state according to a signal received from the control panel.

9. The backpack tool system according to claim 8, wherein
the backpack power supply device further comprises a power tool storage cover arranged on a side of the backpack assembly, and the power tool storage cover is capable of being detachably connected to the backpack assembly.

10. The backpack tool system according to claim 8, further comprising an alarm device, wherein
the alarm device is arranged on the backpack assembly or the power tool, and the alarm device is electrically connected with the control panel.

11. The backpack tool system according to claim 8, wherein
the backpack power supply device further comprises a power tool recording system, the power tool recording system comprises a memory, the memory is electrically connected with the control panel, the control panel is configured to read current information of the power tool and store usage data of the power tool according to the current information.

12. The backpack tool system according to claim 11, wherein
the control panel is configured to determine whether the power tool needs maintenance based on changes in a motor current of the power tool.

13. The backpack tool system according to claim 8, further comprising a first tool and a second tool, wherein
the first tool and the second tool are configured to be electrically connected with the backpack power supply device through the power cable, and at least one of the first tool and the second tool is controlled by the control panel.

14. The backpack tool system according to claim 13, wherein
a control signal of the control panel is transmitted to the first tool or the second tool through the power cable or a wireless connection.

15. The backpack tool system according to claim 14, wherein
when the first tool or the second tool is connected with the backpack power supply device, the control panel is configured to receive a signal transmitted by the first tool or the second tool to identify the first tool or the second tool.

16. The backpack tool system according to claim 13, wherein
the control panel is configured to control an operation of the first tool or the second tool based on a type of the first tool or the second tool.

17. The backpack tool system according to claim 8, further comprising a second temperature sensor arranged in each body of the power tool, wherein
when a port of the power tool is electrically connected with the connecting terminal, the second temperature sensor is electrically connected with the control panel to send a motor temperature of the power tool to the control panel.

18. The backpack tool system according to claim 8, further comprising a wireless communication module, wherein the backpack tool system is connected with an external intelligent device through the wireless communication 5 module.

19. The backpack tool system according to claim 18, wherein the external intelligent device is provided with a display device capable of displaying a working status of the 10 backpack tool system.

\* \* \* \* \*